United States Patent

[11] 3,631,843

[72] Inventors John O. Yeiser
302 Cleveland Drive, Huntington Beach, Calif. 92648;
John O. Yeiser, III, 24961 Cienega Lane, Mission Viejo, Calif. 92675
[21] Appl. No. 883,388
[22] Filed Dec. 9, 1969
[45] Patented Jan. 4, 1972

[54] FLUID ADDITION SYSTEM FOR INTERNAL COMBUSTION ENGINES
3 Claims, 3 Drawing Figs.
[52] U.S. Cl. ............................................. 123/25 L,
123/25 M, 123/32 EA, 123/139 E, 123/198 A
[51] Int. Cl. .......................................... F02d 19/00,
F02d 19/12, F02b 47/02
[50] Field of Search ............................... 123/1, 1 A,
25, 25.5, 25.52, 25.53, 25.54, 198 A, 32 E, 139 E, 127

[56] References Cited
UNITED STATES PATENTS

| | | | |
|---|---|---|---|
| 1,274,233 | 7/1918 | Bellion | 123/25.53 |
| 1,777,199 | 9/1930 | Graff | 123/25.54 |
| 1,901,618 | 3/1933 | Waters et al. | 123/198 A |
| 2,445,337 | 7/1948 | Robinson | 123/25.5 |
| 2,554,612 | 5/1951 | Bills et al. | 123/25.5 |
| 3,482,558 | 12/1969 | Casey et al. | 123/139 |
| 3,490,422 | 1/1970 | Bullis | 123/25 |
| 3,500,799 | 3/1970 | Benson | 123/32 E1 |

Primary Examiner—Al Lawrence Smith
Attorney—Lawrence Fleming

ABSTRACT: A system for adding water or other combustion-affecting fluid to the intake system of an internal combustion engine, to utilize expansion of such fluid into steam within the cylinders, as caused by the heat of explosion of the fuel, to increase power; to reduce smog-producing exhaust emissions; and to reduce the percentage of lead-containing and/or other toxic additives needed in the fuel. The fluid is pumped to the intake at a rate proportional to the engine speed, and in an inverse relation to the intake manifold vacuum. In one embodiment, a pump is driven mechanically from the engine and a valve is controlled by the vacuum. In another, a fixed-stroke electric pump is driven by an electronic pulse-generating circuit, the pulse rate being determined by two inputs, viz, a DC rate voltage derived from the ignition primary circuit, and a variable resistance actuated from the vacuum. In another, a variable-stroke pump is driven from an electronic pulse-generating circuit, the pulse rate being derived from a DC voltage determined by the ignition primary circuit pulse rate, while the stroke of the pump is mechanically controlled by a diaphragm or bellows exposed to the intake vacuum. The system is adapted for retrofit to existing engines with a minimum of engine modification and labor.

PATENTED JAN 4 1972

INVENTORS:
JOHN O. YEISER
JOHN O. YEISER, III
BY Lawrence Fleming
AGENT

INVENTORS:
JOHN O. YEISER
JOHN O. YEISER, III
BY Lawrence Fleming
AGENT

FLUID ADDITION SYSTEM FOR INTERNAL COMBUSTION ENGINES

This invention relates to systems for adding fluid to the intake systems of reciprocating internal combustion engines, to modify the combustion of fuel so as to increase power, reduce smog-producing emissions, and reduce the need for antiknock fuel additives such as tetraethyl lead. The fluid used is preferably water, with or without the addition of hydrogen peroxide, alcohol and/or other nontoxic additives. Systems of this general type have heretofore been used in military aircraft for the purpose of increasing power.

The present invention relates primarily to the control of the pumping and flow of the fluid.

A variety of means for this purpose is shown in the art. An example is the patent to Vanderpoel, U.S. Pat. No. 2,676,577, in which the fluid in the supply tank is pressurized by the exhaust manifold pressure, and is valved to the intake under control of the intake manifold vacuum.

The present invention presents the advantages of (1) pumping and control of the fluid flow rate so that is it approximately a constant fraction of the fuel flow rate, varying as required under all combinations of engine speed and throttle opening; and (2) providing such a system that is relatively simple and inexpensive, and is suitable for retrofitting to existing engines with a minimum of engine modification and labor.

To this end, major portions of the present system are electrical in nature.

We have found that a satisfactory way of approximating the proportionality of fluid flow to fuel flow is to proportion the fluid flow rate according to engine speed, also varying in an inverse manner with intake manifold vacuum. The two coefficients of proportionality may be adjustable, to get the best fit for a given type of engine.

One form of the invention employs a pump to add fluid, driven mechanically from the engine to obtain a flow rate proportional to speed. In addition, a valve controlled by the intake vacuum via a diaphragm or bellows may be used to control the flow at varying magnitudes of vacuum.

Another form of the invention employs an electric variable-stroke pump operated at a submultiple of the rate of opening of the breaker points, providing a stroke rate proportional to engine speed. To achieve the inverse relation to vacuum, the stroke is restricted by a stop which is mechanically moved by a diaphragm or bellows connected to the vacuum line.

In a third form of the invention, a fixed-stroke electric pump is driven at a pulse rate that is proportional to speed and varies in inverse relation to vacuum, by electronic circuitry controlled both by the breaker point rate and the vacuum.

In the above two forms of the invention that use electric pumps, and electronic driving and control circuitry has a novel form. A current transformer in the primary circuit to the ignition breaker points feeds a rectifier circuit, which produces a DC control voltage proportional to the firing rate, or point opening rate, and hence proportional to the engine speed. A selected adjustable portion of this DC control voltage is used to control the repetition rate of a DC-to-pulse-rate converter (also known as a VCO or voltage-controlled oscillator). Each output pulse of this converter produces one stroke of the pump, so that the pump stroke rate is proportional to engine speed. The constant of proportionality can be adjusted by merely adjusting the portion of the above control voltage which is fed to the VCO.

Such circuitry could take the form of known types of frequency-dividing or counter circuits, but these have been found to be unsatisfactory in practice. They lack the adjustability feature, and are subject to unreliability and false triggering in an automotive environment.

BRIEF DESCRIPTION OF THE DRAWINGS

In FIG. 1, an internal combustion engine 1 of any suitable type is indicated, the same having an intake manifold 2, a carburetor 3, and a carburetor air intake 4, as is conventional. The fluid, such as water, to be fed or added into the intake system of the engine is indicated at 10, contained in a tank 5. The fluid passes through a pipe 17 to a pump 6. This pump 6 is driven by any suitable mechanical means, indicated as dotted line 7, from a front pulley or other convenient point 9 on engine 1. The drive means 7 may be of the variable-ratio type, the variability feature being indicated schematically by arrow 8. Pump 6 is preferably of the positive-displacement type; hence its delivery rate will be proportional to engine speed.

Figure 1:
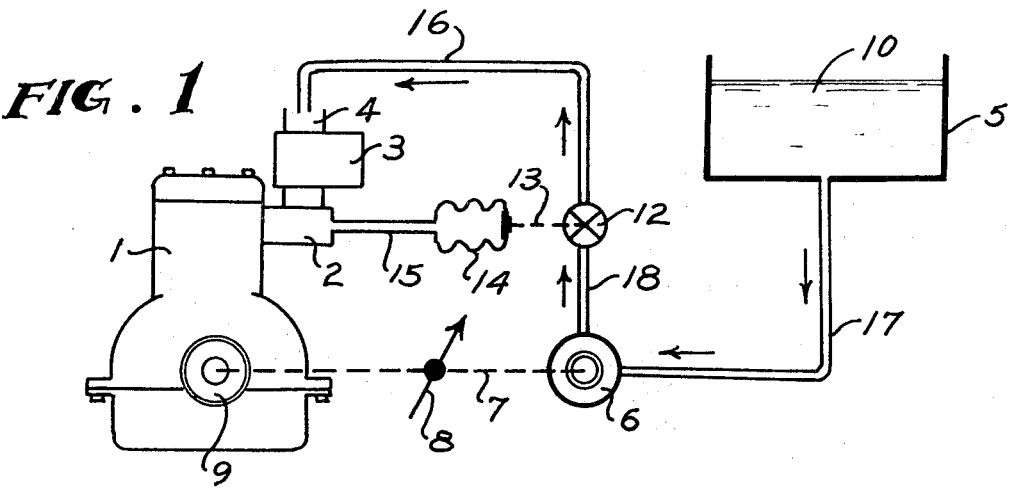
FIG. 1 is a diagram of a system according to the invention.

To further control the fluid flow rate so that it also varies in a generally inverse manner to the intake manifold vacuum, a valve 12 is provided, connected by a pipe 18 to the outlet side of pump 6. The outlet of valve 12 goes to a pipe 16, thence to the air intake 4 of carburetor 3. To control the valve 12, a bellows or like device 14 is provided to control the valve through a mechanical linkage of any suitable type, indicated by dotted line 13. The bellows device 14 is connected by a tube 15 to the intake manifold 2. The linkage 13 is arranged in a suitable known manner to actuate the valve to reduce the flow through it when bellows device 14 is compressed by an increase in vacuum in intake manifold 2. A diaphragm, or a piston and cylinder, or other equivalent, may be used in place of bellows device 14.

ELECTRICAL CONTROL SYSTEM

Figure 2:
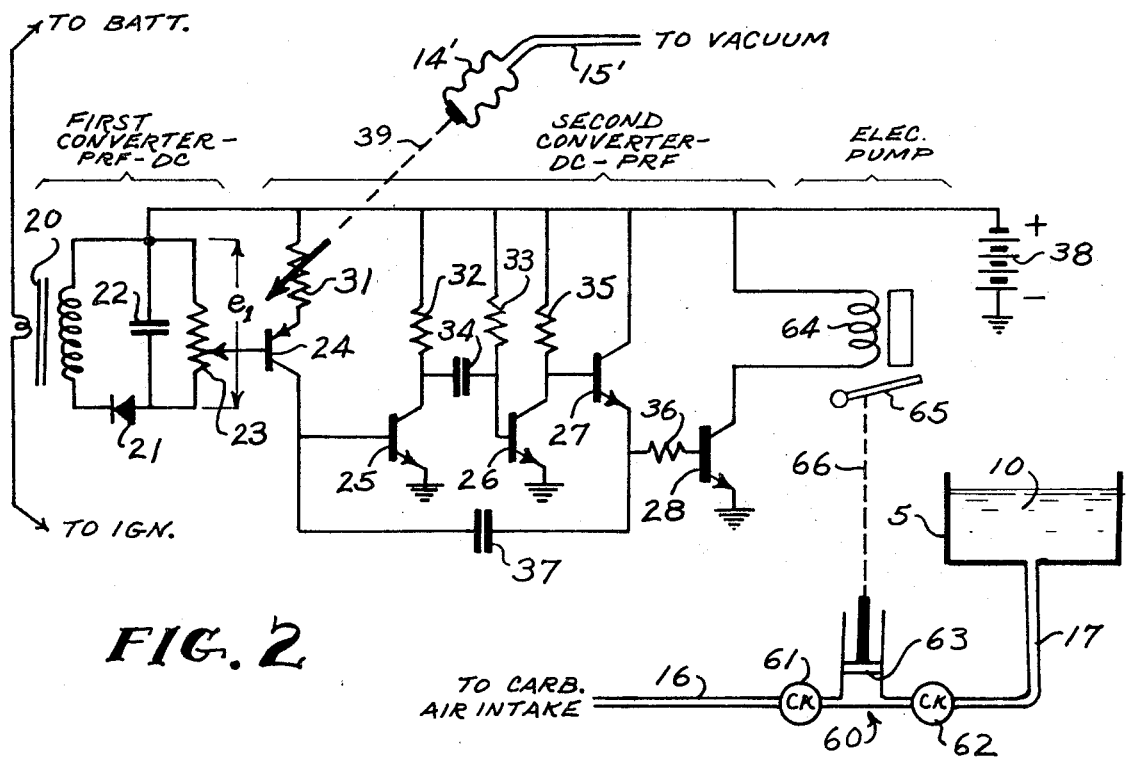
FIG. 2 is a diagram of a modification of the invention having an electronically controlled fixed-stroke electric pump.

FIG. 2 show schematically an electrical pump control system to provide the same desired type of variation of fluid flow as a function of engine speed and intake manifold vacuum. It is particularly suitable for retrofitting on existing engines, requiring a minimum of engine modification and labor. Fluid, such as water 10 contained in tank 5, is shown as before, with a pipe 17 leading to a pump 60 and an outlet pipe 16 leading to the carburetor air intake (not shown).

The pump 60 may comprise a piston 63 in a cylinder, with appropriate check valves 61, 62. Alternatively, pump 69 may be of any known positive-displacement type. The piston 63, or equivalent moving element, is moved back and forth by any suitable electromagnetic means 64, 65, such as an electromagnet and an armature, or a solenoid. The mechanical connection between moving element 63 and armature 65 is indicated by dotted line 66.

The coil or electromagnet 64 is fed with electrical pulses of approximately equal width or duration but of variable repetition rate or frequency, by the circuitry about to be described. Each pulse produces one stroke of the pump 60, delivering a predetermined volume of fluid. Thus, the averaged rate of delivery of the pump 60 is proportional to the pulse repetition rate or frequency (PRF).

The remainder of FIG. 2 shows the circuitry which delivers electrical pulses to coil 64 at a rate proportional to the engine speed, and also varying in an inverse manner with the manifold vacuum.

In FIG. 2, a current transformer 20 is connected in series with the primary circuit to the breaker points in the engine distributor. The number of current pulses in this circuit per minute equals half the engine speed in RPM times the number of cylinders. The voltage across the secondary of the transformer is approximately a replica of the current waveform in the primary, and consist of a series of relatively short jagged pulses, occurring at a rate proportional to engine speed. The secondary voltage is rectified by a diode 21, and the resulting DC voltage smoothed by a relatively large capacitor 22. The DC control voltage $e_1$ across capacitor 22 is thus proportional to engine speed. This portion of the circuitry is a PRF (pulse repetition frequency) to DC converter, or first converter, as noted on the drawing.

A potentiometer 23 is connected across capacitor 22, and so the rectified control voltage $e_1$ appears across its ends. A portion of this DC control voltage $e_1$, from the slider of potentiometer 23, is fed to the base of a transistor 24.

Transistors 24–27 constitute the active elements of a voltage controlled oscillator, or DC to PRF converter, as noted on the drawing (herein also termed the second converter). It generates pulses at a rate proportional to the DC control voltage $e_1$, and inversely proportional to the magnitude of resistant 31 (to be described below). Its output pulses are fed to a power transistor 28, which in turn drives the coil 64 to operate the pump 60.

This DC - PRF converter, or second converter, operates as follows: Transistors 25 and 26 provide voltage gain, and emitter-follower transistor 27 provides current gain, without phase reversal, so that a feedback path from transistor 27 to the base of transistor 25 will produce relaxation oscillations in the manner of a free-running multivibrator. The output is in the form of flat-topped pulses. The duration of each pulse is determined primarily by resistors 32, 33 and coupling capacitor 34. The spacing or repetition rate of the pulses is determined mainly by the capacitance of feedback or timing capacitor 37 and by the DC bias current fed into the base circuit of the transistor 25. This bias current is provided by the collector circuit of transistor 24, which acts as a constant-current source. The DC collector current of this transistor 24 is, as is evident, a function of the DC voltage applied to its base, and also of the magnitude of its emitter resistor 31. Thus, the repetition rate or frequency of the output pulses that operate the pump depends on the DC control voltage applied to the base of transistor 24, and also on the magnitude of its emitter resistor 31.

The emitter voltage bias is some fraction of the DC control voltage $e_1$, selected by choosing the position of the slider on potentiometer 23. The coefficient of proportionality between engine speed and pulse repetition rate is thus chosen by setting potentiometer 23 as required.

The coefficient of proportionality between intake manifold vacuum and pulse rate (a relation of the inverse type) depends on the value of variable resistor 31 and the details of the mechanical linkage 39 which varies it.

Variable resistor 31 is varied mechanically by means of a bellows or the like 14' which is connected to the intake manifold (not shown in FIG. 2) through a pipe 15'. The mechanical linkage between the bellows or the like 38 and the resistor 31 is indicated schematically by dotted line 39. The linkage is so arranged, in any suitable known manner, that the resistance of resistor 31 is increased when bellows device 14' is made shorter by an increase in vacuum, thereby slowing the pulse rate and, hence, the pumping rate.

In FIG. 2, resistor 35 is a conventional collector load resistor, and resistor 36 is a conventional element to limit the base current of power transistor 28. Power for the whole system may be supplied by the regular car battery, e.g., 38.

VARIABLE-STROKE PUMP SYSTEM

Figure 3:
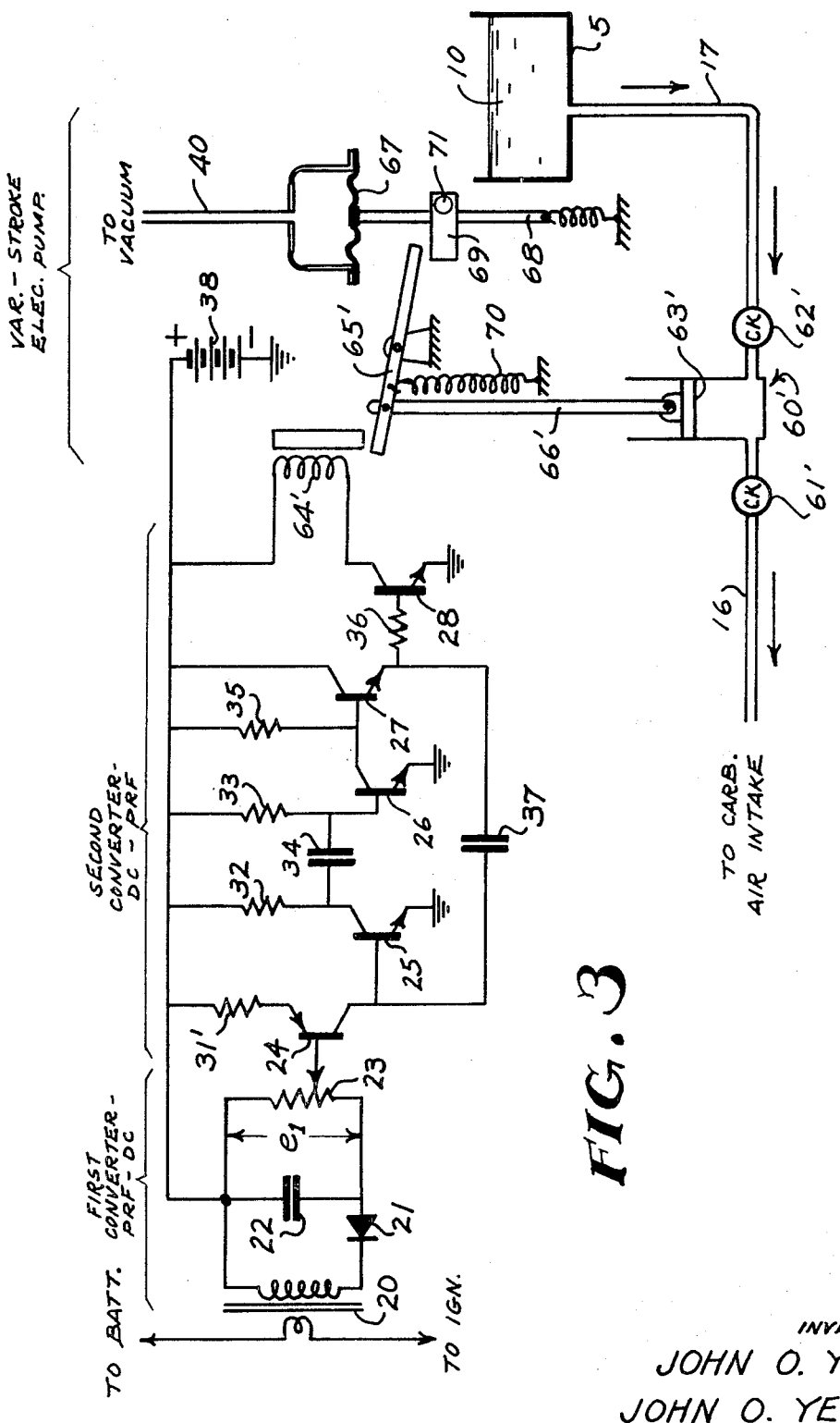
FIG. 3 is a diagram of another modification having an electronically controlled variable-stroke electric pump.

FIG. 3 shows schematically a modification of the invention in which the manifold vacuum controls the stroke of the fluid pump instead of partaking in the control of the pulse repetition rate. In FIG. 3, the electronic circuitry, comprising current transformer 20, transistors 24–28, etc., is the same as the corresponding circuitry in FIG. 2, except that the emitter resistor 31' of transistor 24 is fixed instead of variable. Otherwise, the same reference numerals are used for corresponding elements.

The pump 60' in FIG. 3 resembles the pump 60 of FIG. 2, but with the addition of the variable-stroke mechanism and its control. The fluid 10 in tank 5 flows through pipe 17 and is pumped by pump 60' into pipe 16, thence to the carburetor air intake (not shown in FIG. 3). Check valves 61' and 62' are used similarly to check valves 61, 62 of FIG. 2. The piston or equivalent moving element (such as a bellows or diaphragm) of pump 60' is operated via linkage or rod 66' from an armature 65', which in turn is moved by an electromagnetic device 64', such as a solenoid.

The armature 65' is pulled upward by electromagnetic element 64' to raise the piston or the like 63' at the start of an energizing pulse applied to the coil. At the end of the pulse, armature 65' is released, and the piston 63' is pulled down by means of a spring 70.

The length of the upstroke is limited by a stop 69, against which a portion of armature 65' strikes. The stop 69 may be mounted on a rod 68, and slidably adjusted therealong, being secured by a thumb nut or the like 71. The rod 68 is moved lengthwise by a diaphragm 67 or the like, actuated from a vacuum line 40. It will be seen that as the vacuum increases, the rod 68 (FIG. 3) will be drawn upward, and the stop 69 will then restrict the stroke of the pump 60' to a shorter travel, reducing the pump delivery rate. Thus, the inverse relation of pump delivery rate to manifold vacuum is accomplished. The proportionality of the number of pump strokes per unit time to the engine speed is attained in the same manner as in FIG. 2.

It will be appreciated that the circuitry shown in FIG. 2 and 3 has substantial advantages over the more obvious use of counter or frequency divider circuits, which might be considered for the purpose of obtaining pump-driving pulses as a function of engine speed. Such digital circuits are highly sensitive to false triggering by stray fast-rise electrical interference pulses, which are ubiquitous in the vicinity of spark-ignition engines. Moreover, such digital circuits cannot provide a place for a stepless adjustment of the proportionality coefficient between engine speed and pulse rate.

The analog circuits of the present invention, on the other hand, offer an inexpensive and convenient means of such adjustment as by potentiometer 23 (FIGS. 2 and 3). Moreover, such circuits are highly immune to interference. The primary current waveform, as it appears in a voltage replica across the secondary of current transformer 20, is heavily smoothed and integrated after rectification by capacitor 22, so that short pulses are suppressed. In addition, free-running multivibrator circuits of the type disclosed are heavily immune to electrical noise, responding only to DC control, as by means of the transistors 24.

We claim:

1. A fluid addition system to deliver a combustion-modifying fluid additive to the intake system of an internal-combustion engine, comprising:
   a positive-displacement pump,
   proportional means to drive said pump to deliver said fluid at a flow rate substantially proportional to the speed of said engine, and
   inverse control means to modify said flow rate in generally inverse relation to the degree of intake manifold vacuum,
   said pump being electrically driven,
   said proportional means comprising an electrical pulse generator driving said pump, and
   said inverse means comprising a vacuum-operated variable electrical circuit element connected to modify the pulse rate of said generator as a generally continuous function of said vacuum.

2. A system as in claim 1, wherein said pulse generator comprises
   a first converter having input terminals connected to the ignition system of said engine and producing a DC control voltage substantially proportional to the firing rate thereof, and further comprises
   a second converter, converting a portion of said DC control voltage into an analogous pulse rate,
   said electrical circuit element being a variable resistor.

3. A system as in claim 2,
   said first converter comprising a current transformer connected in the distributor primary circuit of said ignition system and feeding a rectifier circuit, and
   said second converter comprising a free-running voltage-controlled multivibrator having a transistor current-source element,
   said DC control voltage being fed to the base of said transistor, and said variable resistor being connected in its emitter circuit.